(12) United States Patent
Gerwe et al.

(10) Patent No.: US 7,113,268 B2
(45) Date of Patent: Sep. 26, 2006

(54) SCINTILLATION TOLERANT OPTICAL FIELD SENSING SYSTEM AND ASSOCIATED METHOD

(75) Inventors: David Roderick Gerwe, Woodland Hills, CA (US); Harold Barry Schall, Oak Park, CA (US); James Preston Stone, Montrose, CA (US)

(73) Assignee: The Boeing Company, Chicago, IL (US)

( * ) Notice: Subject to any disclaimer, the term of this patent is extended or adjusted under 35 U.S.C. 154(b) by 221 days.

(21) Appl. No.: 10/755,793

(22) Filed: Jan. 12, 2004

(65) Prior Publication Data

US 2005/0151960 A1 Jul. 14, 2005

(51) Int. Cl.
*G01J 1/42* (2006.01)
*G01J 1/20* (2006.01)
*G01B 9/02* (2006.01)

(52) U.S. Cl. ............. 356/121; 356/512; 356/521; 250/201.9

(58) Field of Classification Search ............ 356/121, 356/512–521; 250/201.9, 332; 359/846, 359/849
See application file for complete search history.

(56) References Cited

U.S. PATENT DOCUMENTS

| | | | |
|---|---|---|---|
| 4,399,356 A * | 8/1983 | Feinleib et al. ........... | 250/201.9 |
| 4,518,854 A * | 5/1985 | Hutchin ..................... | 356/521 |
| 4,804,269 A * | 2/1989 | Elterman ................... | 356/520 |
| 4,950,878 A * | 8/1990 | Ulich et al. ............... | 250/201.9 |
| 5,412,200 A * | 5/1995 | Rhoads ...................... | 250/201.9 |
| 6,163,381 A * | 12/2000 | Davies et al. ............. | 356/521 |
| 6,570,143 B1 * | 5/2003 | Neil et al. ................. | 250/201.9 |
| 6,630,656 B1 * | 10/2003 | Wirth ......................... | 250/201.9 |
| 6,987,255 B1 * | 1/2006 | Smith ........................ | 250/201.9 |

OTHER PUBLICATIONS

D.L. Fried, "Adaptive Optics Wave Function Reconstruction and Phase Unwrapping When Branch Points are Present," *Optics Communications*, 200 p. 43-72, 2001.
Troy A. Rhoadarmer, et al., "Complex Field Reconstruction Using Gradient and Intensity Measurements from a Shack-Hartmann Wave Front,"Proc. SPIE vol. 4494, p. 233-244, Feb. 2002.
Jeffrey D. Barchers, et al., "Evaluation of the Performance of Hartmann Sensors in Strong Scintillation," *Applied Optics*, vol. 41(6), Feb. 2002.
Jeffrey D. Barchers, "Evaluation of the Impact of Finite-Resolution Effects on Scintillation Compensation Using Two Deformable Mirrors," JOSAA vol. 18(12), Dec. 2001.
David R. Gerwe, et al., "Closed-Loop Control for Adaptive Optics Wavefront Compensation in Highly Scintillated Conditions," Proc. SPIE vol. 5087, p. 2, 2003.

* cited by examiner

*Primary Examiner*—Gregory J. Toatley, Jr.
*Assistant Examiner*—Sang H. Nguyen
(74) *Attorney, Agent, or Firm*—Alston & Bird LLP

(57) ABSTRACT

An optical field sensing system and an associated method are provided that are tolerant of scintillation. The system includes a wavefront sensor that measures gradients across a wavefront at a first resolution defined by the subapertures of the wavefront sensor. The system also includes an intensity sensor that measures the intensity across the wavefront at a higher resolution. The system further includes a wavefront processor that determines respective phases across the wavefront. In addition to the gradients and the intensity measurements, the wavefront processor may determine the respective phases based also upon the noise affiliated with the measurements. In this regard, the wavefront processor may determine the respective phases across the wavefront at least partially based upon the gradients as adjusted by weights that are based upon the intensity measured by the intensity sensor and are influenced by evidence of scintillation.

14 Claims, 2 Drawing Sheets

SCINTILLATION TOLERANT OPTICAL FIELD SENSING SYSTEM AND ASSOCIATED METHOD

FIELD OF THE INVENTION

The present invention relates generally to optical field sensing systems and methods and, more particularly, to optical field sensing systems and methods that are tolerant of scintillation so as to continue providing accurate estimates of a wavefront that is experiencing scintillation.

BACKGROUND OF THE INVENTION

Wavefront detection and analysis are desirable for many applications. For example, telescopes and other optical sensing systems desirably measure an optical wavefront in an accurate fashion. Additionally, directed energy weapons, such as high energy lasers and the like, often require an associated optical sensing system for detecting the optical wavefront returning from a target. In addition to astronomy and directed energy weapons systems, a number of other applications utilize or will utilize optical wavefront detection including scientific measurement systems, optical communications systems (such as those utilizing free space lasers) and medical imaging including vision correction, ophthalmology and microscopy.

An optical sensing system generally determines the phase of the optical wavefront. By analyzing the phase of the optical wavefront, sources of optical disturbances can be characterized. For example, common sources of optical disturbances include atmospheric turbulence or other disturbances in the atmospheric path. Additionally, the phase of an optical wavefront can help to characterize the optical system itself, such as for diagnostic purposes. In this regard, the phase of the optical wavefront can provide the information identifying imperfections in the optics, imperfections with the laser or the like. In addition to merely identifying the optical disturbances and/or characterizing the optical system, the wavefront measurement can be utilized to provide wavefront compensation, such as by reshaping a deformable mirror, by post-processing the optical signals or both.

A typical optical sensing system includes a collection telescope and a wavefront sensor for receiving an optical image that is directly related to and that characterizes aspects of the field at the collection telescope. Conventional wavefront sensors include Shack-Hartmann sensors and Shearing sensors. By way of example, a Shack-Hartmann sensor includes an array of lenses and a charge coupled device (CCD) camera. The array of lenses effectively divides the optical wavefront into a plurality of subapertures. The output of each lens is directed onto a plurality of pixels of the CCD camera. In one common embodiment, the output of each lens is directed onto a group of sixteen pixels, generally arranged in a four-by-four block and said to be associated with the subaperture.

As known to those skilled in the art, a wavefront sensor, such as a Shack-Hartmann sensor, typically determines the wavefront gradient for each subaperture. Based upon the gradients, the phase of the optical wavefront may be determined. The most common approach, as known to those skilled in the art, is to make the phase a least squares fit to the measured gradients. This approach is implemented by multiplying the gradients by a precomputed matrix, which associates the gradient measurements with various parts of the wavefront. In one much discussed enhancement to this approach to determining the phase of the wavefront, a weighted least squares reconstruction technique is employed in which the gradients of the optical wavefront are weighted to emphasize the impact of those gradients predicted to be the most accurate and having the highest information content. A common method is to assign a weight to a gradient that equals the average intensity of the portion of the optical wavefront captured by the respective subaperture raised to some power. This average intensity is proportional to the sum of the values of the CCD pixels corresponding to the subaperture, minus any background level. Alternatively the value of the maximum pixel in the subaperture region can serve as a similar measure to be assigned as a weight. Note that for weighted least-squares methods the important feature is the relative magnitudes of the weights to each other, e.g. multiplying all weights by some positive constant would not influence the solution. Processing-time considerations have heretofore limited the actual implementation of said approach, but a recent reformulation of the weighted least squares technique as a Lagrange constraint problem has put it in a form susceptible to rapid Cholesky decomposition techniques. See, for example, D. R. Gerwe, "Closed Loop Control for Adaptive Optics Wavefront Compensation in Highly Scintillated Conditions", SPIE Proc. 5087 (2003).

Based upon the phase of the optical wavefront, the optical sensing system can address the effect of any optical disturbances, such as atmospheric turbulence and imperfections in the optics. For example, the optical sensing system may include a deformable mirror that is controllably deformed in response to the detected phase of the optical wavefront to accommodate or offset the effect that optical disturbances have had on the optical wavefront. In addition to or instead of the controlled deformation of a deformable mirror, the optical sensing system may subject the signals representative of the optical wavefront to post processing to similarly reduce, if not eliminate, the effects of optical disturbances upon images or other measurements made by the optical system.

One type of optical disturbance that is particularly difficult to address is scintillation, that is, spatio-temporal fluctuations in the intensity of the optical wavefront. Scintillation generally induces three types of performance loss. One type of performance loss is directly associated with the scintillated intensity profile. For imaging applications this profile should ideally be flat, while for high-energy laser applications, the laser should ideally match this scintillated profile, but typically does not. The second type of performance loss relates to the degradation of the wavefront sensor itself. Optical wavefronts having increased scintillation generally have regions in which the intensity varies greatly. The quantity measured by a subaperture of a wavefront sensor is the spatial average of the phase or phase gradient within the subaperture region and weighted by the corresponding spatial distribution of the amplitude or intensity of the optical field. Increased scintillation therefore generally reduces the accuracy of the phase measurement of the optical wavefront. The third type of performance loss is associated with wavefront singularities. In this regard, optical wavefronts having increased scintillation generally have increased numbers of wavefront singularities, which are intensity nulls generally referred to as branch points. The performance losses associated with branch points depend on methods used to process the measurements. By way of example, FIG. 1 depicts the performance of various optical sensing systems, such as Shack-Hartmann (shack) and Schearing (shear) sensors, as expressed by the Strehl ratio, a common measure of the performance of an adaptive optics system, as a function of the Rytov number, a common measure of scintillation strength. As shown, the performance of the wavefront sensors decreases significantly as the Rytov number increases. As denoted by the legend associated with FIG. 1, the optical sensing systems may include either a Shack-Hartmann (shack) or shearing (shear) wavefront sensor and either a faceplate or conventional deformable mirror (CVDM) or a piston segment deformable mirror (PSDM) and may employ either a least squares reconstruction algorithm (LS) or a weighted least squares (WLS) reconstruction algorithm in which the gradients of the wavefront are weighted by some measure of the intensity of the wavefront.

Accordingly, optical sensing/wavefront processing systems are available that determine the phase of an optical wavefront and, based upon the phase, controllably position a deformable mirror and/or appropriately process the signals representative of the optical wavefront. However, the performance of these systems is somewhat degraded by scintillation. As such, it would be advantageous to design an optical sensing system that was tolerant of scintillation and that provided an accurate measurement of the phase of an optical wavefront even if the optical wavefront experienced scintillation, thereby permitting appropriate wavefront compensation to be provided, such as by means of properly shaping a deformable mirror or by properly processing the signals representative of the optical wavefront.

SUMMARY OF THE INVENTION

An optical field sensing system and an associated method are provided by the embodiments of the present invention that are tolerant of scintillation. As such, the optical field sensing system and method of embodiments of the present invention accurately determine the phase of an optical wavefront, even in instances in which the optical wavefront is scintillated. As such, the optical field sensing system and method of the present invention can provide appropriate wavefront compensation, such as by appropriately shaping a deformable mirror and/or appropriately processing the signals representative of the optical wavefront, such that the wavefront measurements suffer less, if any, degradation due to scintillation than that associated with conventional optical sensing systems.

According to one embodiment, an apparatus for determining respective phases across a wavefront includes a wavefront processor for receiving data defining the wavefront gradients across the wavefront and for receiving data defining the intensity across the wavefront. In this regard, the wavefront processor may be an element of an optical field sensing system that also includes a wavefront sensor and an intensity sensor. In this embodiment, the wavefront sensor receives the wavefront and measures wavefront gradients thereacross. In this regard, the wavefront sensor measures the wavefront gradients at a first resolution. The intensity sensor, such as a near-field camera, also receives the wavefront and measures the intensity thereacross. In this regard, the intensity sensor measures the intensity with a second resolution that is greater than the first resolution.

In one embodiment, the wavefront sensor defines a plurality of subapertures and measures a respective subgradient within each subaperture. In this embodiment, the intensity sensor, such as near field camera, may include a plurality of pixels that are smaller than the subapertures defined by the wavefront sensor. By measuring the intensity of the portion of the wavefront that impinges upon each pixel, the intensity sensor measures the intensity of the wavefront with greater resolution than the wavefront sensor that measures the wavefront gradients.

Based upon the wavefront gradients and the higher resolution intensity measurements, the wavefront processor determines respective phases across the wavefront. The measurements obtained by the wavefront sensor and/or intensity sensor generally have at least some noise. Thus, the wavefront processor of one embodiment determines the respective phases across the wavefront based not only upon the wavefront gradients and the higher resolution intensity measurements, but also based upon the expected and/or estimated noise affiliated with the measurements.

While the wavefront processor may determine the respective phases across the wavefront in accordance with various estimation techniques, such as a maximum likelihood estimate, a maximum a priori estimate and a minimum mean square error estimate, the wavefront processor of one embodiment determines the respective phases across the wavefront in accordance with a weighted least squares fit to the measured gradients. The weights assigned to each measured gradient adjust its relative emphasis and influence on the reconstructed wavefront. The wavefront processor advantageously determines the weights from the measured data, typically in real-time, such as to give higher weight to the measurements predicted to be most accurate and carry the highest level of information. In one embodiment, the measurements that are predicted to be the most accurate are those subapertures having the greatest intensity. Thus, the weights of the subapertures having the largest intensity may be increased relative to other subapertures having lower intensities. Conversely those measurements that are considered the least accurate are assigned lower weights. In this regard, those measurements that appear subject to scintillation are generally assigned lower weights. Scintillation can be evidenced in various manners including subapertures having great variability in the intensity and subapertures that appear to include a branch point as evidenced by a local intensity null or by the spiral structure in the phase gradient associated with and surrounding a branch point.

In addition to or instead of the weights that are determined based upon the intensity measurements of the intensity sensor, weights may be determined based upon intensity measurements by the wavefront sensor. In instances in which weights are determined based upon the intensity measurements of the intensity sensor and the wavefront sensor, the weights may be combined, such as by being multiplied together, and then the composite weight may be utilized to weight the measured gradients. Typically the weights are also modified by some thresholding filter that cause the modified weight values to asymptotically approach some maximum (or minimum value) as the unmodified values become very large (or very small).

Thus, an optical field sensing system is provided in which the phase of an optical wavefront is determined with increased accuracy even in the event of scintillation by weighting the gradients of the optical wavefront with intensity information that has a greater resolution than the wavefront gradients. Thus, portions of the optical wavefront that have significant scintillation or otherwise have a greater likelihood of containing branch points and which are therefore less reliable can be deemphasized. Corresponding methods for sensing an optical field are also provided according to other aspects of the present invention.

BRIEF DESCRIPTION OF THE DRAWINGS

Figure 1:
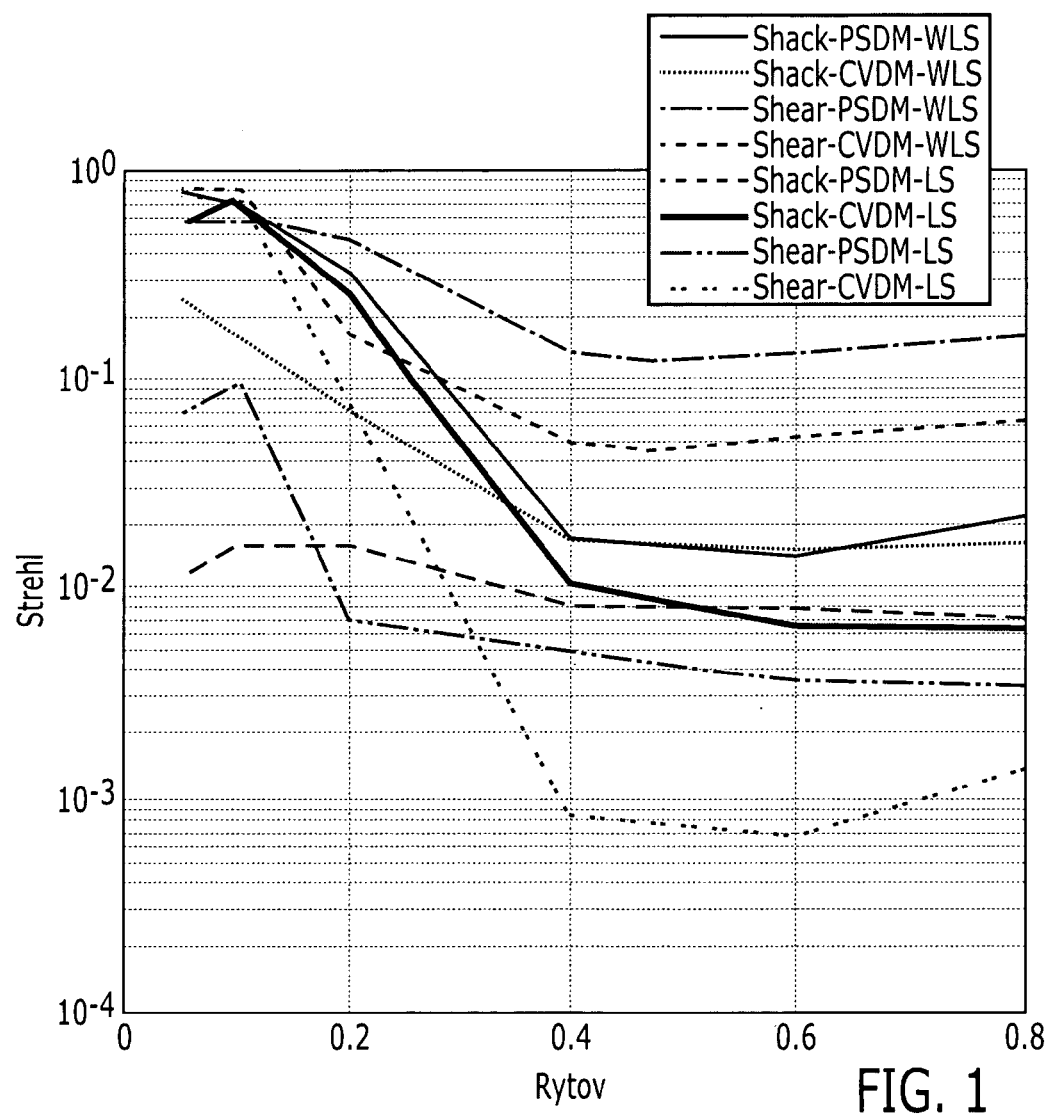
Figure 2:
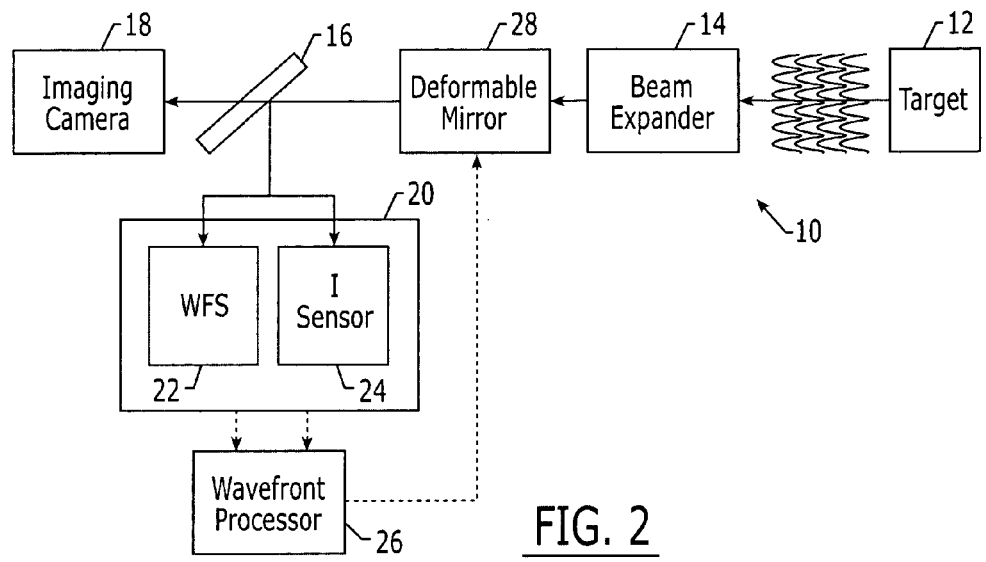
Figure 3:
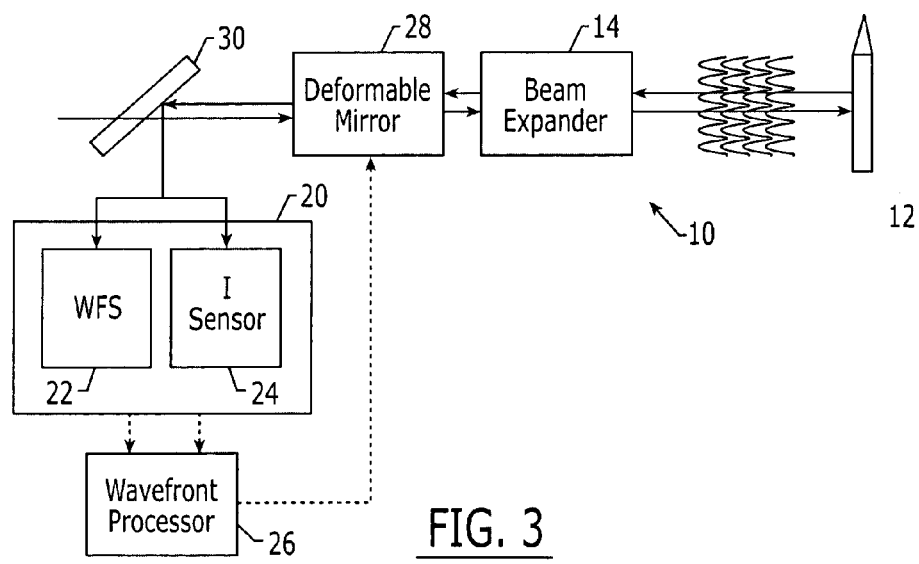

Having thus described the invention in general terms, reference will now be made to the accompanying drawings, which are not necessarily drawn to scale, and wherein:

FIG. 1 is a graphical representation of the Strehl ratio as a function of the Rytov number for a number of optical sensing systems employing different wavefront sensors, deformable mirrors and reconstruction methodologies;

FIG. 2 is a block diagram of an optical field sensing system of one embodiment of the present invention; and FIG. 3 is a block diagram of an optical field sensing system of another embodiment of the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

An optical field sensing system 10 of the present invention can be utilized to determine the phase of an optical wavefront for a wide variety of applications. For example, the optical field sensing system may be utilized in conjunction with an imaging system as shown in FIG. 2. Alternatively, the optical field sensing system could be utilized in conjunction with directed energy weapons, such as high energy lasers and the like, as shown in FIG. 3. Still further, the optical field sensing system can be used in applications beyond astronomy and directed energy weapons, including scientific measurement systems, optical communications systems and medical imaging systems, such as vision correction, ophthalmology and microscopy, among others.

Referring now to FIG. 2, an optical field sensing system 10 for capturing an image of a target 12, such as a star, a planet, a spacecraft or the like, is depicted. As shown, the optical field from the target is received by a collection telescope 14 or other type of beam expander. Among other functions, the collection telescope serves to resize the received optical field as known to those skilled in the art such that the field can be detected and processed as described below. As shown, the optical field sensing system can also include a beam splitter 16 for splitting the field from the target that has been captured by the collection telescope and for providing a first portion of the image to a conventional imaging system 18 for further processing as known to those skilled in the art, while providing a second portion of the field captured by the collection telescope to a sensor 20 as described below.

The optical field sensing system 10 includes a sensor 20 including both a wavefront sensor 22, such as a Shack-Hartmann sensor or a shearing sensor, and an intensity sensor 24, such as a near field camera. Both the wavefront sensor and the intensity sensor receive the fields from the target 12 that have characteristics similar to each other and to that captured by the collection telescope 14 and are, in fact, images that are directly related to and that characterize aspects of that field. The wavefront sensor measures the wavefront gradients across the wavefront, while the intensity sensor measures the intensity across the wavefront.

By way of example, the wavefront sensor 22, such as a Shack-Hartmann sensor, may include an array of lenses that define a plurality of subapertures with each lens defining a respective subaperture. Thus, the wavefront received by the wavefront sensor is effectively divided into a number of different portions, each portion of which being subtended by a respective lens. The wavefront sensor of this embodiment also includes a CCD camera or the like for receiving the output of the array of lenses. The CCD camera includes a plurality of pixels, each defined by a respective CCD element. Typically, there are many more pixels than there are lenses. In this regard, the portion of the field subtended by each lens is generally focused upon a predefined number of pixels, such as 16 pixels arranged in a 4×4 block in one embodiment. For the block of pixels that receive the portion of the wavefront subtended by each lens, the wavefront sensor typically only considers the centermost pixels upon which the respective lens is principally focused, with the pixels adjacent the edge of the block ignored so as to avoid the deleterious effects associated with the overlap of images between adjacent subapertures and the other edge effects. Based upon the plurality of images each associated with a local portion of the wavefront as captured by the CCD camera of the wavefront sensor and, in particular, based upon the centermost pixels of the block of pixels associated with each subaperture of the wavefront sensor, the wavefront sensor determines the wavefront gradients across the wavefront in a manner known to those skilled in the art. The resolution with which the wavefront sensor determines the gradients is dictated by the subapertures with the respective gradient measured within each subaperture.

The intensity sensor 24 typically comprises a near field camera that is generally imaged at the system's entrance aperture. The near field camera generally includes an array of CCD elements that each define a respective pixel. Although not necessary for the practice of the present invention, the array of CCD elements may be the same in terms of size and number as the CCD elements of the camera of the wavefront sensor 22. The intensity sensor measures the intensity across the wavefront. The resolution with which the intensity sensor measures the intensity is dictated by the size of the pixels with the intensity separately measured by each pixel. Thus, the resolution with which the intensity sensor measures the intensity is greater than the resolution with which the wavefront sensor measures the wavefront gradients, i.e., the pixels of the intensity sensor are smaller than the subapertures of the wavefront sensor.

The optical field sensing system 10 also includes a wavefront processor 26. The wavefront gradient measurements and the intensity measurements are both provided to the wavefront processor. Based upon the wavefront gradients and the intensity, the wavefront processor determines respective phases across the wavefront. The processor may be a microprocessor, a personal computer, a server computer or any other type of processing element capable of performing the functions described hereinbelow.

Based upon the phase of the wavefront as determined by the wavefront processor 26, the optical field sensing system 10 can make appropriate corrections to offset any optical disturbances including, but not limited to, atmospheric turbulence and other disturbances in the atmospheric path, as well as imperfections in the optics and imperfections in the signal source. For example, the optical field sensing system can include a deformable mirror 28 as shown in FIGS. 2 and 3 that may be appropriately shaped by the wavefront processor as known to those skilled in the art to provide the desired corrections. In addition, or alternatively, the signals representative of the image captured by the optical field sensing system may be post-processed to make the desired corrections. As described below, the optical field captured by the telescope can be more precisely characterized and corrected according to the present invention since the optical field sensing system provides improved measurements of the phase of the wavefront, especially in instances in which the image has experienced scintillation.

As shown in FIG. 3, the optical field sensing system 10 need not merely passively collect images of a target 12, but the optical field sensing system can illuminate the target and detect the returned reflection from the target. In this regard, the optical field sensing system may also include an aperture sharing element 30, such as a reflective plate defining a hole therethrough such that the outgoing illumination beam can pass through the hole defined by the aperture sharing element so as to illuminate the target. The collection telescope 14 can then receive the reflected optical field from the target and provide the reflected optical field from the target to both the wavefront sensor 22 and the intensity sensor 24 for measuring the wavefront gradients and the intensity of the wavefront, respectively. Based upon the wavefront gradients and the intensity of the wavefront, the wavefront sensor can again compensate for atmospheric or other optical disturbances as well as imperfections within the optics themselves, such as by controllably adjusting the shape of a deformable mirror 28 and/or by appropriately processing the signals representative of the reflected optical field from the target. Thus, the laser or other optical source of a directed energy weapon can be more precisely trained on the target by taking into account the optical disturbances noted by the optical field sensing system. In all other respects, however, the components of the optical field sensing system of FIG. 3 are comparable to and operate in the same manner as the corresponding components of the optical field sensing system of FIG. 2.

The wavefront processor 26 can determine the phase of the wavefront in various manners. In one embodiment, the wavefront sensor determines the phase of the wavefront in accordance with a weighted least squares approximation of the gradients. A commonly discussed optical field sensing system weights the gradient associated with each subaperture by some function of the average intensity of that portion of the field captured by the subaperture and, more particularly, by the centermost CCD elements upon which the portion of the optical field captured by the subaperture is focused. As used herein, the average intensity for a subaperture shall refer both to the average intensity across all of the pixels associated with a subaperture upon which the respective lens focuses the corresponding portion of the field, or the average intensity detected by the centermost pixels upon which the respective lens focuses the corresponding portion of the optical field.

In order to more accurately weight the gradients, the wavefront processor 26 of the present invention advantageously weights at least some of the gradients by a weight that is at least partially based upon the intensity measured by the intensity sensor 24. Since the intensity sensor measures the intensity at a higher resolution than the wavefront sensor 22 measures the gradients, the wavefront processor can more intelligently weight the gradients in order to better compensate for atmospheric and other optical disturbances as well as imperfections in the optics and the like.

In one embodiment, those portions of the wavefront that experience significant scintillation are weighted lightly such that the corresponding wavefront gradients do not contribute as significantly to the resulting phase of the wavefront. In this regard, the wavefront processor 26 can identify those portions of the wavefront that include a branch point or a null, which is indicative of scintillation. For example, in order to determine if a respective portion of the wavefront includes a branch point, the wavefront processor can determine the directional sum of gradients around a closed loop in various regions of the wavefront. The directional sum of gradients should equal or be very near zero unless the closed loop encompasses a branch point, thereby permitting branch points to be identified. Thus, if the directional sum exceeds a predefined value, typically a value very near zero, the respective region of the wavefront may be considered to be likely to include a branch point or to otherwise have relatively high levels of scintillation. For more information on this technique, see, for example, J. P. Stone, et al., "Branch Cut Sensitive Wavefront Reconstruction for Low Elevation Viewing", AMOS Technical Conference Proceedings, pp. 276–85 (2001); and D. R. Gerwe, "Closed Loop Control for Adaptive Optics Wavefront Compensation in Highly Scintillated Conditions", SPIE Proc. 5087 (2003). As such, the wavefront processor can subscribe a relatively low weight to the gradient associated with the respective subaperture that includes a branch point. Additionally, the wavefront processor may identify those portions of the wavefront in which the intensity varies greatly across a respective subaperture, and which are also indicative of scintillation. Other portions of the wavefront that similarly exhibit higher levels of scintillation may likewise be lightly weighted, in a similar fashion in order to reduce the otherwise deleterious effects of scintillation upon the phase of the wavefront. Conversely, portions of the wavefront that do not suffer from scintillation and that therefore appear to be more accurate can be weighted more highly. For examples, those subapertures that exhibit a level of uniformity in intensity that is higher than average may be weighted more heavily.

As described, the wavefront processor 26 can determine weights based upon the intensity measurements of the intensity sensor 24. The wavefront sensor 22 can also measure the intensity across the wavefront, albeit with lower resolution than the intensity sensor. As such, the wavefront processor can determine weights based upon the intensity measurements of the wavefront sensor, either in addition to or instead of the weights determined based upon the intensity measured by the intensity sensor. For example, the intensity of each subaperture can be normalized by the average intensity across the wavefront in order to determine the weight to be subscribed to each subaperture. In instances in which multiple weights are determined for each subaperture, such as a first weight based on the intensity measurements of the intensity sensor and a second weight based on the intensity measurements of the wavefront sensor, the weights may be combined, such as by multiplying the weights for a respective subaperture together. Although not necessary for the practice of the present invention, the resulting weight of each subaperture may be subjected to a thresholding filter to insure that the weights are within a workable or predefined range. As such, the thresholding filter may modify the resulting weights to asymptotically approach some maximum value (or minimum value) as the resulting weight otherwise approaches a very large value (or very small value).

Based on the resulting weights for each subaperture, the wavefront processor 26 can weight the measured gradients. The weighted gradients can, in turn, be utilized by the wavefront processor to more accurately determine the phase of the wavefront. Thus, the optical field sensing system 10 can more accurately compensate for atmospheric or other optical disturbances in the optical path and/or imperfections in the optics.

Alternatively, the wavefront processor 26 can employ a maximum likelihood field estimation technique in which the electromagnetic field received by the collection telescope 14 is represented in complex form as α(x,y)+iβ(x,y) in which α and β are functions of two spatial coordinates and x and y represent the x and y dimensions, respectively, of the wavefront. Based on a particular hypothesis for the complex field a set of predicted slope and intensity measurements can be calculated. According to this embodiment, the slope or gradient of a respective subaperture of the wavefront may be related to a hypothesis for the field in the x and y dimensions as $S_x(k)$ and $S_y(l)$ as follows:

$$S_x(k) = \frac{\int_{(x,y) \in R_{Sx}^{(k)}} \alpha(x,y) \frac{\partial \beta(x,y)}{\partial x} - \beta(x,y) \frac{\partial \alpha(x,y)}{\partial x} dx dy}{\int_{(x,y) \in R_{Sx}^{(k)}} \alpha(x,y)^2 + \beta(x,y)^2 dx dy}$$

$$S_y(l) = \frac{\int_{(x,y) \in R_{Sx}^{(k)}} \alpha(x,y) \frac{\partial \beta(x,y)}{\partial y} - \beta(x,y) \frac{\partial \alpha(x,y)}{\partial y} dx dy}{\int_{(x,y) \in R_{Sy}^{(l)}} \alpha(x,y)^2 + \beta(x,y)^2 dx dy}$$

in which k and l denote respective subapertures in the x and y dimensions of the wavefront, respectively. Additionally, the intensity may be related to a hypothesis for the field as follows:

$$I(q) = \int_{(x,y) \in R_I^{(q)}} \alpha(x,y)^2 + \beta(x,y)^2 dx dy$$

in which q denotes the respective pixel or other region over which the intensity is determined.

For each subaperture, the gradients predicted from the hypothesized field can then be compared to the measured gradients. Likewise, for each pixel, the intensity values predicted from the hypothesized field can be compared to the measured intensity. Accordingly, the wavefront processor 26 of this embodiment can quantify the similarity between hypothesized gradients and intensity and the measured gradients and intensity in accordance with the following probability function:

$$Prob(\text{Measurement}|S_x, S_y, I) = C - \sum_k \frac{[S_x^{meas}(k) - S_x(k, \alpha, \beta)]^2}{2\sigma_k^2} - \sum_l \frac{[S_y^{meas}(l) - S_y(l, \alpha, \beta)]^2}{2\sigma_l^2} - \sum_q \frac{[I^{meas}(q) - I(q, \alpha, \beta)]^2}{2\sigma_q^2}$$

and thus quantify the likeliness and consistency of the hypothesized field with the measured field. In this equation $S_x^{meas}$, $S_y^{meas}$ and $I^{meas}$ represent the measured gradients in the x direction, the measured gradient in the y direction and the measured intensity, respectively, and C is a constant. By iteratively adjusting the field hypothesis so as to improve the consistency with the measured data an optimum estimate of the true field is obtained.

In the foregoing probability function, the result is also dependent upon noise statistics of the wavefront sensor 22 and the intensity sensor 24. In this regard, each sensor generally introduces at least some noise, typically a combination of Poisson shot noise and Gaussian detector noise as known to those skilled in the art. The probability function therefore takes into account the variance attributable to the noise introduced by each respective sensor as represented by $\sigma_k$, $\sigma_l$ and $\sigma_q$. As noted, the variances due to noise are advantageously determined on a subaperture basis (as denoted by the subscripts k and l) in conjunction with the gradient measurements and on a pixel basis (as represented by the subscript q) for the intensity measurements. A wavefront sensor according to the present invention may employ other methods of estimating the noise attributable to the respective sensors other than using the expected variance without departing from the spirit and scope of the present invention. Measurements that are less noisy will have a larger influence on the reconstructed wavefront than noisier sensors. In this sense the noise variances, perform a similar function as the weights used in the weighted least squares method previously discussed.

By iteratively calculating the gradients and intensity corresponding to the hypothesized field and, in turn, the similarity of these predicted gradients and intensity to the measured gradients and intensity based upon different values of α and β, the wavefront processor 26 can determine the values of α and β that maximize the foregoing probability function. A wavefront processor employing the maximum likelihood field estimation technique described above can therefore determine that the most likely representation of the complex electromagnetic field received by the collection telescope 14 has α and β that equal to those values which maximize the foregoing probability function. The wavefront processor can then determine the phase of the wavefront from the mathematical representation of the most likely electromagnetic field.

There are many methods of maximizing the probability function known to those skilled in the art of solving optimization problems. Common methods include Newton-Raphson, simplex, and conjugate gradient. By determining the phase in this manner, the wavefront processor 26 accurately determines the phase of the wavefront, even in the event of scintillation. In this regard, the field that maximizes the probability equation above, i.e. the maximum likelihood estimate (ML), provides the theoretical best estimate of any possible method that does not use statistical knowledge about the random nature of the field. If such statistical knowledge is available and can be described through another probability function, this function can by multiplied with the probability distribution above which by Bayes rule gives the posterior distribution. As known to those versed in the art of estimation theory, maximizing this joint distribution provides the maximum a priori estimate (MAP) of the field and takes advantage of the additional knowledge provided by the statistical description of the random nature of the field. In another variation using this same posterior distribution, the field which will have on average the least minimum mean square difference with the true field can be obtained, i.e. the minimum mean square error (MMSE) estimate. The ML, MAP, and MMSE estimates will inherently take advantage of all knowledge about the physical and statistical description of the measurement system embodied in the equations above. This knowledge includes, for example, the detailed physical description of the relationship of the measurement to the field, the noise statistics of the measurement, and all additional knowledge provided by the near field intensity measurement. These features enable the field most consistent with the measured data to be determined and provides a superior estimate to all other estimation methods.

Accordingly, the optical field sensing system 10 and method according to the present invention are tolerant of scintillation. As such, the optical field sensing system and method can more accurately determine the phase of a wavefront according to any of several different reconstruction techniques by utilizing intensity measurements that have a higher resolution than the corresponding gradient measurements and, in some embodiments, by taking into account the noise statistics of the wavefront sensor 22 and the intensity sensor 24. By more accurately determining the phase of the wavefront, the optical field sensing system can therefore more precisely compensate for atmospheric and other optical disturbances, as well as imperfections in the optics and the like.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An optical field sensing system comprising:
   a wavefront sensor for receiving a wavefront and for measuring wavefront gradients thereacross with a first resolution, wherein said wavefront sensor defines a plurality of subapertures and measures a respective subgradient within each subaperture;
   an intensity sensor for also receiving the wavefront and for measuring intensity thereacross with a second resolution greater than the first resolution, wherein said intensity sensor comprises a near field camera comprising a plurality of pixels, wherein said pixels are smaller than the subapertures defined by said wavefront sensor, and wherein said near field camera measures the intensity of the portion of the wavefront that impinges upon each pixel; and
   a wavefront processor for receiving the wavefront gradients and the intensity from said wavefront sensor and said near field camera, respectively, said wavefront processor determining respective phases across the wavefront based upon both the wavefront gradients and the higher resolution intensity measurements.

2. An optical field sensing system comprising:
   a wavefront sensor for receiving a wavefront and for measuring wavefront gradients thereacross with a first resolution;
   an intensity sensor for also receiving the wavefront and for measuring intensity thereacross with a second resolution greater than the first resolution; and
   a wavefront processor for receiving the wavefront gradients and the intensity from said wavefront sensor and said intensity sensor, respectively, said wavefront processor determining respective phases across the wavefront based upon both the wavefront gradients and the higher resolution intensity measurements, wherein said wavefront processor determines the respective phases across the wavefront in accordance with a weighted least squares fit to the measured gradients.

3. An optical field sensing system according to claim 2 wherein said wavefront sensor defines a plurality of subapertures and measures a respective subgradient within each subaperture.

4. An optical field sensing system according to claim 3 wherein said intensity sensor comprises a near field camera comprising a plurality of pixels, wherein said pixels are smaller than the subapertures defined by said wavefront sensor, and wherein said near field camera measures the intensity of the portion of the wavefront that impinges upon each pixel.

5. An optical field sensing system according to claim 3 wherein said wavefront processor determines a weight for each subgradient based upon the higher resolution intensity measurements obtained by said intensity sensor.

6. An optical field sensing system according to claim 5 wherein said wavefront sensor determines the respective phases across the wavefront at least partially based upon the gradients and associated weights that are at least one of: (i) increased as the intensity of a respective subaperture increases, (ii) decreased as the variability in the intensity across a respective subaperture increases, (iii) decreasing the weight if the intensity indicates that the subaperture includes a branch point, and (iv) decreasing the weight if a directional sum of gradients surrounding the subaperture is more than a predefined value.

7. An optical field sensing system according to claim 5 wherein said wavefront sensor also measures the intensity of each subaperture, and wherein said wavefront processor determines a weight for each subgradient based upon the intensity measured by said wavefront sensor, and wherein said wavefront processor further combines the weights that are determined for a respective subgradient based upon the intensity measured by said wavefront sensor and the higher resolution intensity measurements obtained by said intensity sensor.

8. A method for sensing an optical field comprising:
   measuring wavefront gradients across a wavefront, wherein the measured wavefront gradients have a first resolution, and wherein measuring wavefront gradients comprises measuring a respective subgradient within each of a plurality of subapeartures into which the wavefront is divided;
   measuring intensity across the wavefront, wherein the measured intensity has a second resolution greater than the first resolution; wherein measuring the intensity comprises measuring the intensity of the portion of the wavefront that impinges upon each of a plurality of pixels, and wherein the pixels are smaller than the subaperture into which the wavefront is divided; and
   determining respective phases across the wavefront based upon both the wavefront gradients and the higher resolution intensity measurements.

9. A method for sensing an optical field comprising:
   measuring wavefront gradients across a wavefront, wherein the measured wavefront gradient have a first resolution;
   measuring intensity across the wavefront, wherein the measured intensity has a second resolution greater than the first resolution; and
   determining respective phases across the wavefront based upon both the wavefront gradients and the higher resolution intensity measurements, wherein determining the respective phases across the wavefront comprises determining the respective phases across the wavefront in accordance with a weighted least squares fit to the measured gradients.

10. A method according to claim 9 wherein measuring wavefront gradients comprises measuring a respective subgradient within each of a plurality of subapertures into which the wavefront is divided.

11. A method according to claim 10 wherein measuring the intensity comprises measuring the intensity of the portion of the wavefront that impinges upon each of a plurality of pixels, and wherein the pixels are smaller than the subapertures into which the wavefront is divided.

12. A method according to claim 10 wherein determining the respective phases across the wavefront further comprises determining the respective phase of the portion of the wavefront associated with a respective subaperture at least partially based upon a weight assigned to each subgradient based upon the higher resolution intensity measurements.

13. A method according to claim 12 wherein determining the respective phase of the portion of the wavefront associated with the respective subaperature comprises determining the weight associated with the respective subaperture by at least one of: (i) increasing the weight as the intensity of the respective subaperture increases, (ii) decreasing the weight as variability in the intensity across the respective subaperture increases, (iii) decreasing the weight if the intensity indicates that the subaperture includes a branch point, and (iv) decreasing the weight if a directional sum of gradients surrounding the subaperture is more than a predefined value.

14. A method according to claim 12 further comprising measuring the intensity of each subaperture at the first resolution, wherein determining the respective phases across the wavefront further comprises determining the respective phase of the portion of the wavefront associated with a respective subaperture at least partially based upon a weight assigned to each subgradient based upon the lower resolution intensity measurements, and thereafter combining the weights that are determined for a respective subgradient based upon the lower resolution intensity measurements and the higher resolution intensity measurements.

* * * * *

UNITED STATES PATENT AND TRADEMARK OFFICE
CERTIFICATE OF CORRECTION

PATENT NO. : 7,113,268 B2 Page 1 of 1
APPLICATION NO. : 10/755793
DATED : September 26, 2006
INVENTOR(S) : Gerwe et al.

It is certified that error appears in the above-identified patent and that said Letters Patent is hereby corrected as shown below:

Column 12,
Line 56, "gradient" should read --gradients--.

Signed and Sealed this

Twentieth Day of February, 2007

JON W. DUDAS
*Director of the United States Patent and Trademark Office*